(12) United States Patent
Jung et al.

(10) Patent No.: US 10,992,862 B2
(45) Date of Patent: Apr. 27, 2021

(54) ELECTRONIC APPARATUS AND METHOD FOR CONTROLLING ELECTRONIC APPARATUS THEREOF

(71) Applicant: SAMSUNG ELECTRONICS CO., LTD., Suwon-si (KR)

(72) Inventors: Jae-il Jung, Seongnam-si (KR); Jin-hyoung An, Hwaseong-si (KR); Min-chul Kim, Seoul (KR); Young-kuk Kim, Suwon-si (KR); Yong-jin Kim, Seoul (KR); Sung-rae Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/813,080

(22) Filed: Mar. 9, 2020

(65) Prior Publication Data
US 2020/0213515 A1 Jul. 2, 2020

Related U.S. Application Data

(62) Division of application No. 15/359,919, filed on Nov. 23, 2016, now Pat. No. 10,587,799.

(30) Foreign Application Priority Data

Jun. 28, 2016 (KR) .......................... 10-2016-0080892
Nov. 8, 2016 (KR) .......................... 10-2016-0148385

(51) Int. Cl.
*H04N 5/232* (2006.01)
(52) U.S. Cl.
CPC ..... *H04N 5/23238* (2013.01); *H04N 5/23258* (2013.01); *H04N 5/23267* (2013.01); *H04N 5/23287* (2013.01)

(58) Field of Classification Search
CPC ....................... H04N 5/23238; H04N 5/23258
See application file for complete search history.

(56) References Cited

U.S. PATENT DOCUMENTS 7,184,609 B2  2/2007  Liu et al.
8,072,496 B2  12/2011  Antsfeld
(Continued)

FOREIGN PATENT DOCUMENTS

CN    104333675 A    2/2015
JP    2005-234224 A   9/2005
(Continued)

OTHER PUBLICATIONS

International Search Report dated Feb. 21, 2017, issued by the International Searching Authority in counterpart International Application No. PCT/KR2016/013565 (PCT/ISA/210).
(Continued)

*Primary Examiner* — Jerry T Jean Baptiste
(74) *Attorney, Agent, or Firm* — Sughrue Mion, PLLC

(57) ABSTRACT

An electronic apparatus for acquiring a panorama image using a plurality of cameras and a method for controlling the electronic apparatus thereof are provided. The electronic apparatus includes a plurality of cameras for capturing an image, a sensor for acquiring movement information, and a processor for determining individual movement information of the plurality of cameras with reference to a predefined location using movement information acquired through the sensor, acquiring a plurality of images through the plurality of cameras based on the individual movement information and generating a panorama image using the plurality of photographed images.

6 Claims, 17 Drawing Sheets

Related U.S. Application Data

(60) Provisional application No. 62/258,687, filed on Nov. 23, 2015.

(56) References Cited

U.S. PATENT DOCUMENTS

| | | | |
|---|---|---|---|
| 8,581,961 B2 | 11/2013 | Lee | |
| 8,654,204 B2 | 2/2014 | Jang | |
| 2004/0183898 A1* | 9/2004 | Endo | H04N 5/23238 348/36 |
| 2004/0246333 A1 | 12/2004 | Steuart, III | |
| 2006/0140604 A1 | 6/2006 | Suda | |
| 2010/0054578 A1* | 3/2010 | Ekpar | G06T 19/003 382/154 |
| 2010/0141799 A1 | 6/2010 | Yamashita | |
| 2011/0110605 A1 | 5/2011 | Cheong | |
| 2011/0115927 A1 | 5/2011 | Jang | |
| 2011/0316970 A1 | 12/2011 | Cheong | |
| 2012/0002096 A1 | 1/2012 | Choi et al. | |
| 2013/0050401 A1 | 2/2013 | Tannhaeuser et al. | |
| 2013/0155205 A1 | 6/2013 | Kosakai | |
| 2013/0258062 A1 | 10/2013 | Noh et al. | |
| 2014/0267586 A1 | 9/2014 | Aguilar | |
| 2014/0267593 A1* | 9/2014 | Kim | H04N 5/23206 348/36 |
| 2014/0340427 A1 | 11/2014 | Baker | |
| 2015/0022677 A1 | 1/2015 | Guo et al. | |
| 2015/0138311 A1 | 5/2015 | Towndrow | |
| 2015/0331598 A1 | 11/2015 | Kang et al. | |
| 2017/0078570 A1 | 3/2017 | Ito | |

FOREIGN PATENT DOCUMENTS

| | | | |
|---|---|---|---|
| JP | 2008-028606 A | 2/2008 |
| JP | 2013-198062 A | 9/2013 |
| JP | 5490040 B2 | 5/2014 |
| KR | 10-2006-0056050 A | 5/2006 |
| KR | 10-0614004 B1 | 8/2006 |
| KR | 10-0926281 B1 | 11/2009 |
| KR | 1020110052124 A | 5/2011 |
| KR | 1020110055241 A | 5/2011 |
| KR | 10-2012-0003751 A | 1/2012 |
| KR | 10-2013-0110339 A | 10/2013 |
| KR | 1020150056379 A | 5/2015 |

OTHER PUBLICATIONS

Written Opinion dated Feb. 21, 2017, issued by the International Searching Authority in counterpart International Application No. PCT/KR2016/013565 (PCT/ISA/237).

* cited by examiner

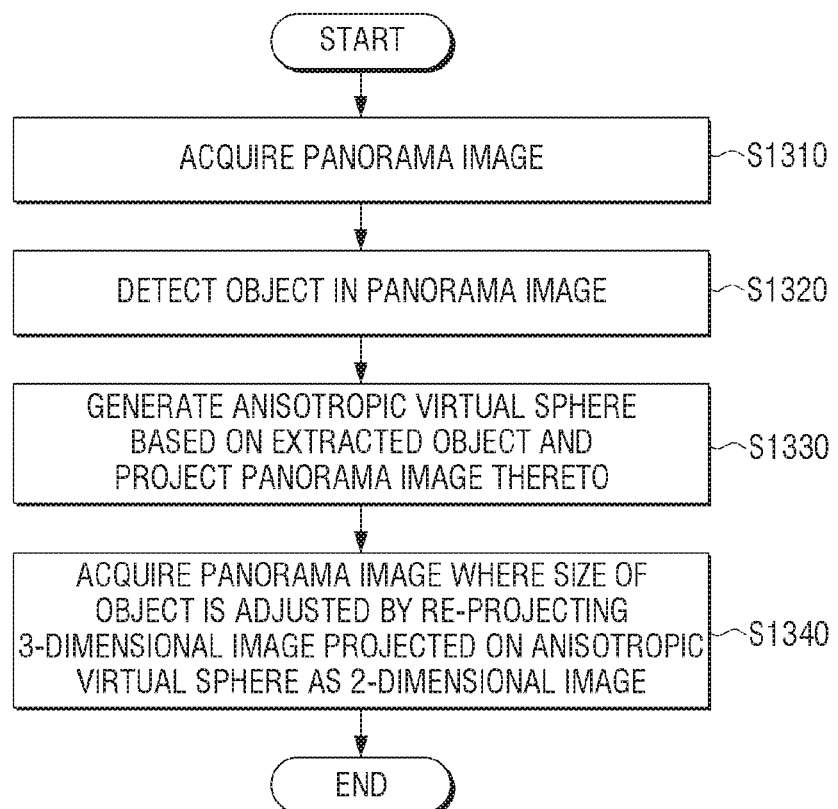

ELECTRONIC APPARATUS AND METHOD FOR CONTROLLING ELECTRONIC APPARATUS THEREOF

CROSS-REFERENCE TO RELATED APPLICATIONS

This application is a divisional application of U.S. patent application Ser. No. 15/359,919, filed on Nov. 23, 2016, issued as U.S. Pat. No. 10,587,799, on Mar. 10, 2020, which claims benefits of Korean Patent Application No. 10-2016-0080892, filed in the Korean Intellectual Property Office on Jun. 28, 2016, Korean Patent Application No. 10-2016-0148385, filed in the Korean Intellectual Property Office on Nov. 8, 2016, and the benefit of U.S. Provisional Patent Application No. 62/258,687, filed in the United States Patent and Trademark Office on Nov. 23, 2015, the disclosures of which are incorporated herein by reference.

BACKGROUND

1. Field

Apparatuses and methods consistent with exemplary embodiments relate to an electronic device and a method for controlling the electronic device, and more particularly, to an electronic device configured to acquire a plurality of images to generate a panorama image through a plurality of cameras and a method for controlling the electronic apparatus thereof.

2. Description of the Related Art

Recently, an apparatus which photographs a plurality of images through a plurality of cameras instead of one camera (or an image sensor) and provides a panorama image using the plurality of images has been developed.

When an image is photographed using a camera, the image photographed by the camera may be unstable due to the movement of a photographer who is holding the camera. Accordingly, when photographing an image using a camera, shake correction may be used as a process of image correction.

In related art, to correct shake, a Digital Image Stabilization (DIS) method or an Optical Image Stabilization (OIS) method has been used. The DIS method refers to a method in which a still image is photographed several times through a camera and shake is corrected by overlapping the images, and the OIS method refers to a method in which shake of an electronic apparatus is sensed and an image is corrected by compensating the movement of a camera according to the sensed shake of the electronic apparatus.

However, when an image is photographed by operating a plurality of cameras at the same time, the movement of a plurality of cameras are different from one another. In other words, to sense each movement of a plurality of cameras, a plurality of sensors corresponding to a plurality of cameras may be required. Accordingly, the amount of calculation is increasing, bring up unit cost of goods inevitably.

SUMMARY

An aspect of one or more exemplary embodiments relates to an electronic apparatus which calculates each movement of a plurality of cameras based on movement of the electronic apparatus which is sensed through one sensor and compensates the movement of the plurality of cameras based on the calculated individual movement to perform shake correction and a method for controlling the electronic apparatus thereof.

Another aspect of one or more exemplary embodiments relates to an electronic apparatus that analyzes movements of feature point a panorama image that is reflect to a three-dimensional (3D) virtual sphere and performs shake correction (it can be also interpreted as movement correction) correction of the panorama image and a method for controlling thereof.

According to an aspect of an exemplary embodiment, there is provided an electronic apparatus for acquiring a panorama image, the electronic apparatus including: a plurality of cameras, each configured to capture an image; a sensor configured to acquire movement information; and a processor configured to: determine individual movement information of the plurality of cameras with reference to a predefined location using the movement information acquired through the sensor; acquire a plurality of processed images through the plurality of cameras based on the individual movement information and the captured images; and generate a panorama image using the plurality of processed images.

The sensor may include a 3-axis acceleration sensor and a 3-axis angle sensor, and wherein the sensor may be further configured to acquire a movement amount of the sensor by using the 3-axis acceleration sensor and acquire a rotation amount of the sensor using the 3-axis angle sensor.

The predefined location may be a center of gravity of the plurality of cameras.

The processor may be further configured to determine an individual rotation amount of the plurality of cameras based on a rotation amount of the sensor which may be sensed by using the 3-axis angle sensor, and determine an individual movement amount of the plurality of cameras based on the movement amount of the sensor which may be sensed by using the 3-axis acceleration sensor and the rotation amount of the sensor which may be sensed by using the 3-axis angle sensor.

The individual rotation amount (RC) may be equal to a rotation amount of the sensor (RS), wherein the individual movement amount (TC) may be TC=PC-RS*PC+TS, wherein TS indicates a movement amount of the sensor, and PC indicates an original location of a camera.

The plurality of cameras may include an Optical Image Stabilization (OIS) unit to correct shake of the plurality of cameras, and wherein the processor may be further configured to acquire a plurality of processed images in which movement may be compensated by controlling the OIS unit based on an individual rotation amount and an individual movement amount of the plurality of cameras.

According to an aspect of another exemplary embodiment, there is provided a method for controlling an electronic apparatus which acquires a panorama image using a plurality of cameras, the method including: capturing images using the plurality of cameras; acquiring movement information using a sensor; determining individual movement information of the plurality of cameras with reference to a predefined location using the movement information acquired through the sensor; acquiring a plurality of processed images through the plurality of cameras based on the individual movement information and the captured images; and generating a panorama image using the plurality of processed images.

The sensor may include a 3-axis acceleration sensor and a 3-axis angle sensor, and wherein the acquiring movement information may include acquiring a movement amount of the sensor by using the 3-axis acceleration sensor and acquiring a rotation amount of the sensor using the 3-axis angle sensor.

The predefined location may be a center of gravity of the plurality of cameras.

The determining may include determining an individual rotation amount of the plurality of cameras based on a rotation amount of the sensor which may be sensed by using the 3-axis angle sensor, and determining an individual movement amount of the plurality of cameras based on the movement amount of the sensor which may be sensed by using the 3-axis acceleration sensor and the rotation amount of the sensor which may be sensed by using the 3-axis angle sensor.

The individual rotation amount (RC) may be equal to a rotation amount of the sensor (RS), wherein the individual movement amount (TC) may be TC=PC-RS*PC+TS, wherein TS indicates a movement amount of the sensor, and PC indicates an original location of a camera.

The plurality of cameras may include an Optical Image Stabilization (OIS) unit to correct shake of the plurality of cameras, and wherein the acquiring a plurality of images may include acquiring a plurality of processed images in which movement may be compensated by controlling the OIS unit based on an individual rotation amount and an individual movement amount of the plurality of cameras.

According to an aspect of another exemplary embodiment, there is provided an electronic apparatus configured to acquire a panorama image, the apparatus including: a plurality of cameras, each configured to capture an image; and a processor configured to: acquire a pre-corrected two-dimensional (2D) panorama image using a plurality of images captured by the plurality of cameras; project the pre-corrected 2D panorama image to a three-dimensional (3D) virtual sphere, determine correction movements of the virtual sphere by analyzing correction movements of a plurality of feature points in the 3D panorama image projected to the virtual sphere; correct the 3D panorama image based on the correction movements of the virtual sphere; and acquire a shake-corrected panorama image by re-projecting the corrected 3D panorama image to a corrected 2D panorama image.

The processor may be further configured to determine correction movements of the virtual sphere to minimize movement of the plurality of feature points.

The processor may be further configured to determine correction movements of the virtual sphere by excluding a feature point that has movement that is greater than or equal to a preset value from among the plurality of feature points.

BRIEF DESCRIPTION OF THE DRAWINGS

FIGS. 10A to 13 are views illustrating an example of adjusting size of an object in a panorama image, according to another exemplary embodiment.

DETAILED DESCRIPTION

Figure 1:
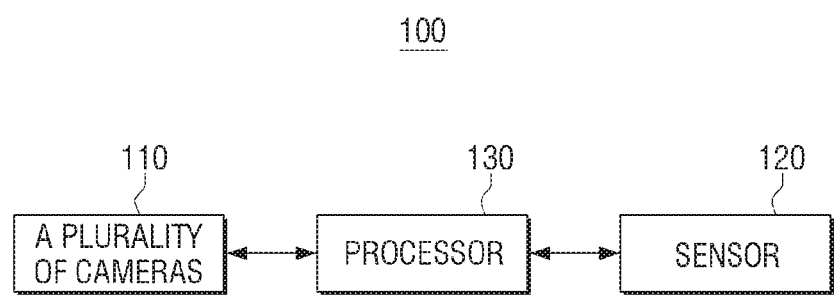
FIG. 1 is a block diagram illustrating a configuration of an electronic apparatus briefly, according to an exemplary embodiment.

Exemplary embodiments will be described herein below with reference to the accompanying drawings. Exemplary embodiments are illustrated in the drawings and the detailed description thereof is provided, however, exemplary embodiments may vary and may be implemented by various exemplary embodiments. Exemplary embodiments are not intended to limit the scope to an exemplary embodiment, and therefore, it should be understood that all the modifications, equivalents or substitutes included under the spirit and technical scope are encompassed. In the explanation of the drawings, the same reference numerals or signs are used to indicate components or elements performing the substantially same functions.

The terms, "include", "comprise", etc., are used to indicate that there are features, operations, elements, or combination thereof, and should not exclude the possibilities of combination or the addition of one or more features, operations, elements, or combination thereof. In addition, it should be understood that the terms "include" or "have" used in the exemplary embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The term "A or B", "at least one of A and B", or "one or more of A and/or B" may include all possible combinations of the items that are enumerated together.

The term such as "first" and "second" used in various exemplary embodiments may modify various elements regardless of an order and/or importance of the corresponding elements, and does not limit the corresponding elements. These terms may be used for the purpose of distinguishing one element from another element. For example, a first user device and a second user device are all user devices, but refer to different user devices. For example, a first element may be named a second element without departing from the scope of right of the on or more exemplary embodiments, and similarly, a second element may be named a first element.

If it is described that an element (e.g., first element) is "directly coupled to" or "directly connected to" another element (e.g., second element), it may be understood that another element (e.g., third element) does not exist between the element and the other element. The terms used in the following description are provided to explain an exemplary embodiment and are not intended to be limiting. A singular expression may include a plural expression, unless otherwise specified in context.

The electronic apparatus according to an exemplary embodiment may be an electronic apparatus including a plurality of cameras. For example, the electronic apparatus may be implemented as a photographing apparatus or a wearable device including a plurality of cameras.

The panorama image according to an exemplary embodiment may be an image which secures a field of vision at 360° or greater than a predetermined angle (for example, 180°).

Example embodiments are described in greater detail below with reference to the accompanying drawings. FIG. 1 is a block diagram illustrating configuration of an electronic apparatus briefly according to an exemplary embodiment. As illustrated in FIG. 1, an electronic apparatus includes a plurality of cameras 110, a sensor 120 and a processor 130.

The plurality of cameras may acquire a plurality of images to generate a panorama image. In this case, the plurality of cameras 110 may be located at a virtual circumference to acquire a 360° image, but this is only an example. The plurality of cameras 110 may be positioned on a straight line.

The sensor 120 collects data to acquire movement information. In particular, the sensor 120 may include a 3-axis acceleration sensor and a 3-axis angle sensor to acquire movement information of the sensor 120. In this case, the 3-axis acceleration sensor may collect data for acquiring a movement amount of the sensor 120 and the 3-axis angle sensor may collect data for acquiring a rotation amount of the sensor 120.

The processor 130 may calculate individual movement information of the plurality of cameras 110 with reference to a predefined location (for example, the center of gravity of the plurality of cameras) using the movement information acquired through the sensor 120, acquire a plurality of images through the plurality of cameras 110 based on the individual movement information, and generate a panorama image using the plurality of photographed images.

Specifically, the processor 130 may calculate an individual rotation amount of the plurality of cameras 110 based on the rotation amount of the sensor 120 which is sensed using the 3-axis angle sensor and calculate an individual movement amount of the plurality of cameras 110 based on the rotation amount of the sensor 120 which is sensed using the 3-axis acceleration sensor and the rotation amount of the sensor 120 which is sensed using the 3-axis angle sensor. In addition, the processor 130 may acquire a plurality of images in which shake is corrected through the OIS method based on the individual rotation amount and the individual movement amount of the plurality of cameras. Further, the processor 130 may generate a panorama image using a plurality of images in which shake is corrected.

Figure 2:
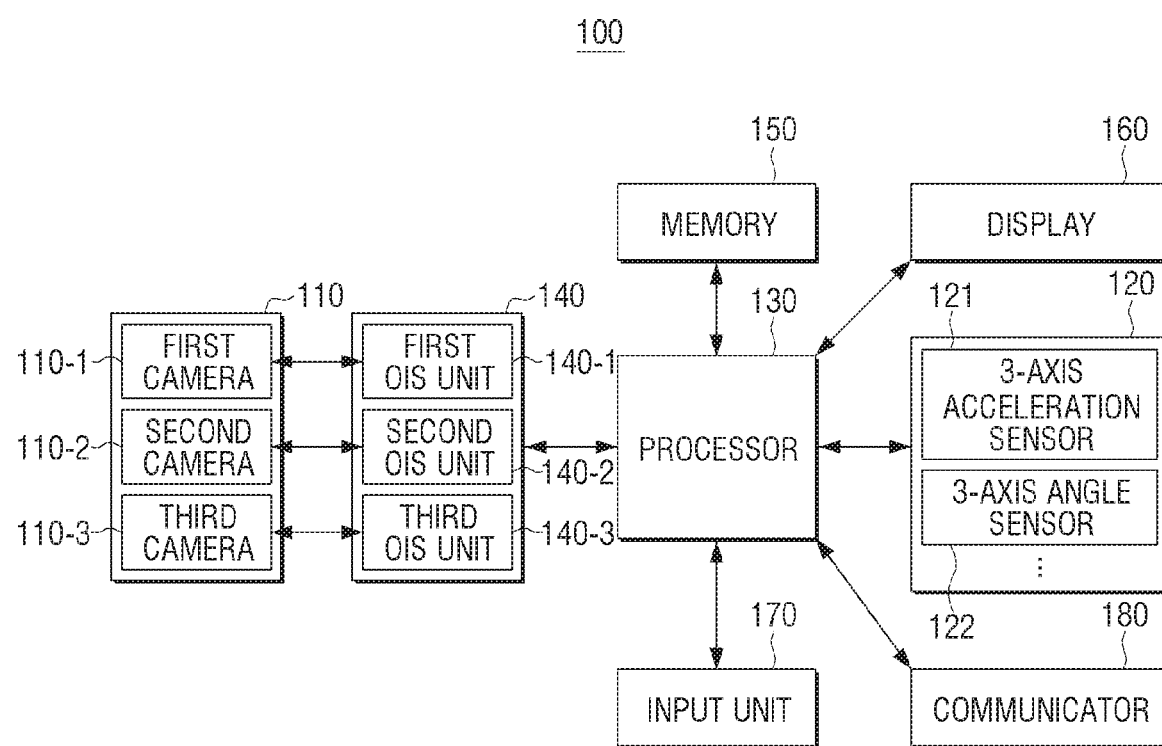
FIG. 2 is a block diagram illustrating a configuration of an electronic apparatus in detail, according to an exemplary embodiment.

FIG. 2 is a block diagram illustrating configuration of an electronic apparatus in detail according to an exemplary embodiment. As illustrated in FIG. 2, the electronic apparatus 100 includes the plurality of cameras 110, an OIS unit 140, the sensor 120, a memory 150, a display 160, an input unit 170 (e.g., input interface), a communicator 180, and the processor 130.

Meanwhile, the configuration illustrated in FIG. 2 is just an example, and new elements may be added or at least one element may be deleted.

The plurality of cameras 110 may acquire a plurality of images to acquire a panorama image. In particular, the plurality of cameras 110 may include a lens, an iris, an image sensor, and an Analog/Digital Converter (DAC). The lens receives light from an external light source to process an image. In this case, the iris adjusts the amount of incident light (light amount) according to the degree of opening/closing of the iris. The image sensor accumulates the light amount input through the lens and outputs an image photographed by the lens in accordance with a vertical sync signal according to the accumulated light amount. The electronic apparatus 100 obtains an image through the image sensor which converts light reflected from a subject to an electrical signal. In particular, if the image sensor is a Charge Coupled Device (CCD) image sensor, a color filter may be required to obtain a color image using the CCD image sensor. In general, a Color Filter Array (CFA) filter is adopted. The CFA has a regular structure in which only light representing one color per each pixel is passed through, and each arrangement structure has different shapes. ADC converts an analog signal output from the image sensor to a digital signal. Meanwhile, the above-described method of a camera photographing an image is only an example, and the camera may photograph an image in different methods. For example, an image can be photographed using a Complementary Metal Oxide Semiconductor (CMOS) image sensor instead of a CCD image sensor.

Meanwhile, the plurality of cameras 110 may include a first camera 110-1, a second camera 110-2 and a third camera 110-3 as illustrated in FIG. 2. In this case, the first to the third cameras (110-1 to 110-3) may be disposed at predetermined intervals (or example, 120°) around a virtual sphere to photograph a 360° image.

In addition, there are three cameras in FIG. 2, but this is only an example. There may be two or more than four cameras.

The sensor 120 is an element to sense a state of the electronic apparatus 100. In particular, the sensor 120 may collect data to obtain movement information of the electronic apparatus 100 (or a sensor).

In this case, the sensor 120 may include a 3-axis acceleration sensor 121 which collects data to sense the movement amount of the sensor 120 and a 3-axis angle sensor 122 which collects data to sense the rotation amount of the sensor 120. In particular, as illustrated in FIG. 3, the 3-axis acceleration sensor 121 may collect data to sense the movement amount (dx, dy, dz) in three axis directions, and the 3-axis angle sensor 122 may collect data to sense the rotation amount (Pitch (p), Yaw (w,) Roll (r)) in three axis directions.

The OIS unit 140 performs OIS correction to perform shake correction with respect to each of a plurality of images which are obtained through the plurality of cameras 110. In this case, the OIS correction refers to a method of correcting hand-shaking (or shaking) by moving a camera in a direction in which the electronic apparatus moves using an actuator.

In particular, as illustrated in FIG. 2, the OIS unit 140 may include a first OIS unit 140-1, a second OIS unit 140-2 and a third OIS unit 140-3. The first OIS unit 140-1 is an element to correct the shaking of the first camera 110-1, the second OIS unit 140-2 is an element to correct the shaking of the second camera 110-2, and the third OIS unit 140-3 is an element to correct the shaking of the third camera 110-3.

Figure 3:
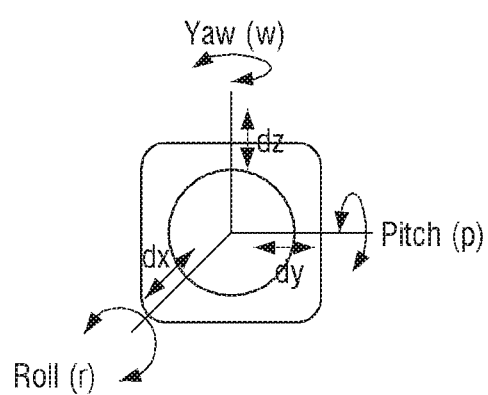
FIG. 3 is a view illustrating a rotation amount and a movement amount of a sensor which is sensed by the sensor, according to an exemplary embodiment.

Meanwhile, there are three OIS units in FIG. 3, but the number of cameras may vary depending on exemplary embodiments. For example, if there are four cameras, there may be four OIS units.

The memory 150 may store commands or data which are received from the processor 130 or other elements (for example, the sensor 120, the OIS unit 140, the display 160, the input unit 170, the communicator 180, etc.), or store commands or data which are generated by the processor 130 or other elements. In addition, the memory 150 may include programming modules such as kernel, middleware, Application Programming Interface (API) or application, etc.

Each of the above-described programming modules may be configured by software, firmware, hardware or combination of at least two of them.

In addition, the memory 150 may store a mathematical formula to calculate the individual movement of the plurality of cameras 110 based on the movement of the sensor 120.

Meanwhile, the memory 150 may be implemented as various memories. For example, the memory may be implemented as an internal memory. The internal memory may include at least one of a volatile memory (e.g., dynamic RAM (DRAM)), static RAM (SRAM), synchronous dynamic RAM (SDRAM), and so on), a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory and so on). According to an exemplary embodiment, the internal memory may be provided in the form of Solid State Drive (SSD). The memory 150 may also be implemented as an external memory. The external memory may further include, for example, compact flash (CF), secure digital (SD), micro secure digital (micro-SD), mini secure digital (Mini-SD), extreme digital (xD), memory stick, and so on.

The display 160 may display a picture, an image, data, etc. In particular, the display may be implemented as liquid-crystal display (LCD), active-matrix organic light-emitting diode (AM-OLED), etc., and may be configured to be flexible, transparent or wearable.

In particular, the display 160 may display a live-view image which is acquired from at least one of a plurality of cameras or an image which is photographed after a shutter button is selected.

The input unit 170 may be configured to receive input of a user command to control the electronic apparatus 100. In particular, the input unit 170, for example, may receive a command or data from a user and transmit the command or data to the processor 130 or the memory 150 through a bus 190.

The input unit 170 may be implemented as various input apparatuses such as touch panel, (digital) pen sensor, key or ultrasonic input apparatus, voice input apparatus, motion input apparatus, etc.

The communicator 180 may be configured to communicate with an external device. In this case, the communicator 180

In this case, the communicator 180 may support a predetermined near field communication protocol (for example, wireless fidelity (Wi-Fi), Bluetooth (BT), near filed communication (NFC)), predetermined network communication (for example, Internet, local area network (LAN), wire area network (WAN), telecommunication network, cellular network, satellite network or plain old telephone service (POTS)), etc.

In particular, the communicator 180 may transmit a panorama image which is acquired by using a plurality of images photographed by the plurality of photographing units 110, to outside.

The processor 130, for example, may receive a command from other elements through a bus, decipher the received command and execute computation or data processing according to the deciphered command.

In addition, the processor 130 may include a main processor and a sub processor, and the sub processor may be implemented as a low-power processor. In this case, the main processor and the sub processor may be configured in a single chip or in separate chips. In addition, the sub processor may include a memory in the form of buffer or stack.

Meanwhile, the processor 130 may be implemented as one of Graphic Processing Unit (GPU), Central Processing Unit (CPU) and Application Processor (AP), and may be implemented as a single chip.

In particular, the processor 130 may calculate individual movement amount and individual rotation amount of each of the plurality of cameras 110 with reference to a predefined location based on the movement amount and the rotation amount of the sensor 120 which is acquired by the sensor 120.

Figure 4:
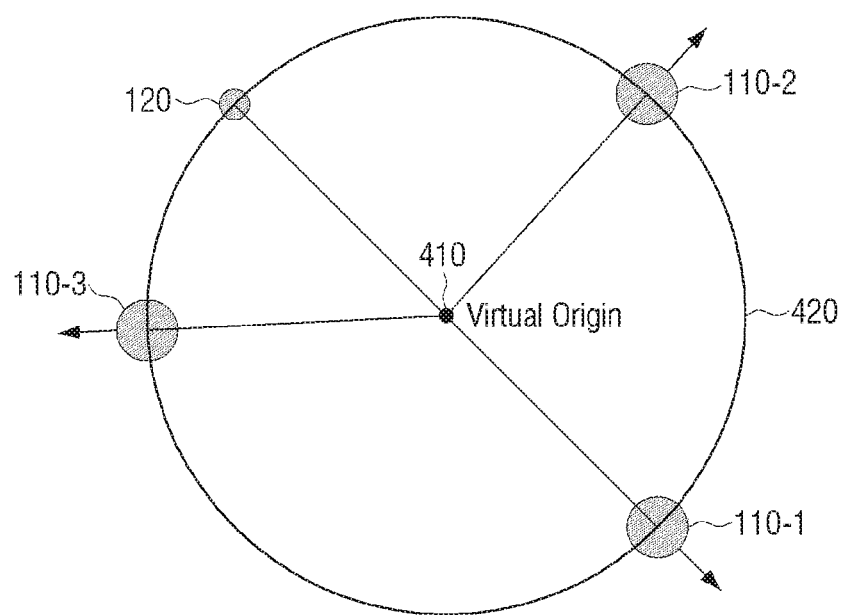
FIG. 4 is a view illustrating a coordinate system in which a plurality of cameras and sensors are disposed with reference to a virtual square one, according to an exemplary embodiment.

Specifically, if the first camera 110-1 to the third camera 110-3 face an outside direction (direction of arrow) of the electronic apparatus 100 to photograph an image as illustrated in FIG. 4, a virtual circle 420 having the center of gravity of the first to the third cameras 110-1 to 110-3 as a virtual starting point 410 may be generated. In this case, the virtual starting point 410 may be a predefined location.

In this case, the first to the third cameras 110-1 to 110-3 and the sensor 120 may be located at a fixed area on the virtual circle. For example, if it is assumed that the virtual starting point 410 may be (0, 0, 0), the location of the sensor may be (PSX, PSY, PSZ), the location of the first camera may be (PC1X, PC1Y, PC1Z), the location of the second camera may be (PC2X, PC2Y, PC2Z), and the location of the third camera may be (PC3X, PC3Y, PC3Z).

The processor 140 may calculate individual rotation amount of each of the first to the third cameras based on the rotation amount of the sensor which is sensed using the 3-axis angle sensor 122, and may calculate individual movement amount of each of the first to the third cameras based on the rotation amount of the sensor 120 which is sensed using the movement amount of the sensor 120 which is sensed using the 3-axis acceleration sensor 121 and the rotation amount of the sensor 120 which is sensed using the 3-axis angle sensor.

Figure 5:
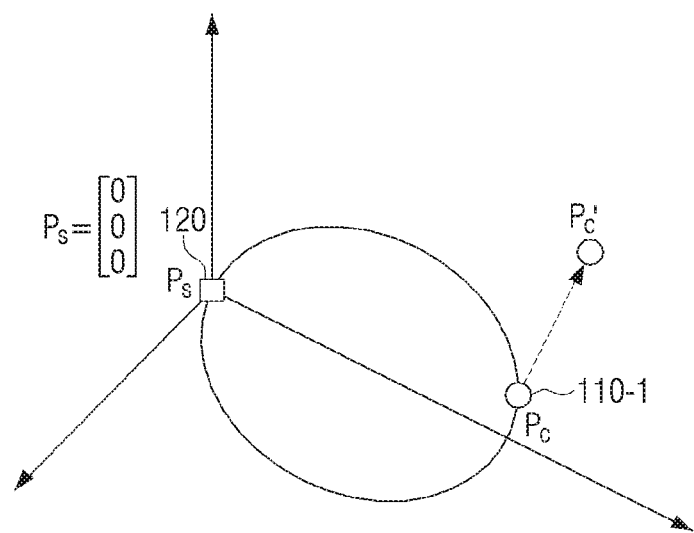
FIG. 5 is a view illustrating a method of calculating individual movement information of a camera based on movement information of a sensor, according to an exemplary embodiment.

Specifically, as illustrated in FIG. 5, if the location of the sensor 120 is Ps (0, 0, 0), the processor 130 may determine that the rotation amount of the sensor 120 is RS (ps,ws,rs) and the movement amount is TS (XS,YS,ZS) based on the data acquired through the sensor 120.

In this case, the processor 130 may calculate the individual rotation amount RC1 and the individual movement amount TC1 of the first camera using Mathematical formula 1 and Mathematical formula 2 below:

$$R_C = R_{S1} \quad \text{[Mathematical formula 1]}$$

$$T_C = P_{C1} - P_{C1'} = P_{C1} - R_S P_{C1} + T_S \quad \text{[Mathematical formula 2]}$$

In this case, the PC1 may be the original location of the first camera 110-1.

The processor 130 may calculate the individual rotation amount and the individual movement amount of the second camera 110-2 and the third camera 110-3 in the above-mentioned method.

The processor 130 performs OIS correction of a camera based on the individual movement amount and the individual rotation amount of each camera. In other words, the processor 130 may control the OIS unit 140 to move each camera based on the calculated individual movement amount and the individual rotation amount.

Accordingly, the processor 130 may acquire a plurality of images in which vibration (or hand-shaking) is amended with respect to each of the plurality of cameras 110.

The processor 130 may generate a panorama image based on a plurality of images. Specifically, the processor 130 may generate a panorama image by mapping and synthesizing the first image photographed by the first camera 110-1, the second image photographed by the second camera 110-2 and the third image photographed by the third camera 110-3.

According to an exemplary embodiment described above, the electronic apparatus 100 which performs shake correction in the OIS method performs shake correction of each of a plurality of cameras using the movement of the sensor 210, but this is only an example. The technical concept may also be applied to the electronic apparatus 100 which performs shake correction in the DIS method.

Specifically, the electronic apparatus 100 calculates individual rotation amount (RC) and individual movement amount (TC) of a plurality of cameras. The electronic apparatus 100 may acquire modified coordinate system (i') by modifying the coordinate system (i) which is photographed using a shaken camera through Mathematical formula 3 below with respect to a plurality of images photographed by the plurality of cameras.

$$i = K_C [R_C | T_C] K_C^{-1} i \qquad \text{[Mathematical formula 3]}$$

Here, KC refers to a variable indicating the characteristics of inside of the cameras.

The electronic apparatus 100 may perform shake correction by mapping the modified coordinate system (i') to each camera.

Figure 6:
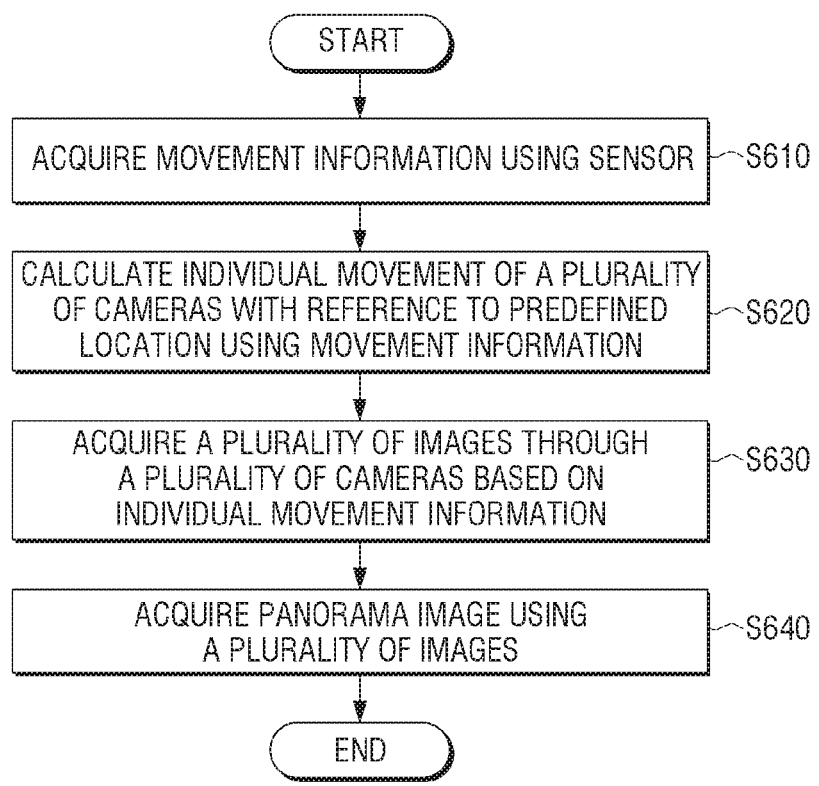
FIG. 6 is a flowchart illustrating a method for controlling an electronic apparatus, according to an exemplary embodiment.

FIG. 6 is a flowchart provided to explain a method for controlling an electronic apparatus according to an exemplary embodiment.

First, the electronic apparatus 100 acquires user information using the sensor 120 (S610). In this case, the electronic apparatus 100 may acquire the movement amount and the rotation amount of the sensor 120.

The electronic apparatus 100 calculates individual movement amount and individual rotation amount of the plurality of cameras 110 with reference to a predefined location using movement information of the electronic apparatus 100 (S620). Specifically, the electronic apparatus 100 may calculate the individual rotation amount of the plurality of cameras 110 based on the rotation amount of the sensor 120 which is sensed using a 3-axis angle sensor, and calculate the individual movement amount of the plurality of cameras 110 based on the movement amount of the sensor 120 which is sensed using a 3-axis acceleration sensor and the rotation amount of the sensor 120 which is sensed using a 3-axis angle sensor.

The electronic apparatus 100 acquires a plurality of images through a plurality of cameras based on individual movement information. In this case, if the OIS method is used, the electronic apparatus 100 may perform shake correction by controlling the movement of the plurality of cameras based on the individual movement information. If the DIS method is used, the electronic apparatus 100 may perform shake correcting by modifying the images which are acquired through the plurality of cameras based on the individual movement information.

The electronic apparatus 100 acquires a panorama image using a plurality of images (S640).

According to an exemplary embodiment described above, the electronic apparatus 100 may perform shake correction by compensating the movement of the plurality of cameras 110 through the single sensor 120.

According to an exemplary embodiment, it is described that shaking of a panorama image is corrected by compensating shaking of a plurality of cameras (110), but this is merely exemplary, and shaking of a panorama image can be corrected through image processing. Below, with reference to FIGS. 7A to 9, an exemplary embodiment of analyzing a feature point of a panorama image reflected to a 3D virtual sphere and correcting shaking of an image will be described.

A plurality of cameras (110) may photograph a plurality of images to generate a panorama image.

The processor (130) may acquire a 2D panorama image using a plurality of images photographed through a plurality of cameras (110), reflect the 2D panorama image to a 3D virtual sphere, analyze movements of a plurality of feature points from a 3D panorama image reflected to a virtual sphere to determine correction movements of the virtual sphere, correct a 3D panorama image based on correction movements of the virtual sphere, and reflect the corrected 3D panorama image to the 2D panorama image to acquire shaking-corrected panorama image.

According to an exemplary embodiment, the processor 130 may acquire 2D panorama image through stitching of a plurality of images photographed by a plurality of cameras 110. In particular, the processor 130 may acquire a panorama image through stitching of a plurality of images, but this is merely exemplary, and a panorama image can be acquired through another method. At this time, 2D panorama image can be a 2D image by equirectangular.

Figure 7A:
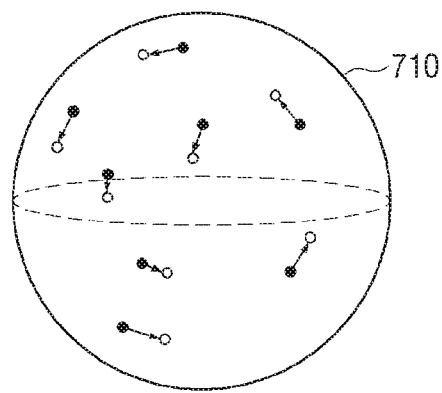
FIGS. 7A to 9 are views illustrating an example of analyzing feature points of a panorama image reflected to a 3D virtual sphere and correcting shaking of a panorama image, according to another exemplary embodiment.

In addition, the processor 130 may reflect the acquired 2D panorama image to a 3D virtual sphere 710. The processor 130 may extract a feature point from among the panorama image reflected to the 3D virtual sphere 710, and as illustrated in FIG. 7A, analyze shaking of the feature point. In this case, the feature point is a pixel for detecting shaking of the camera 110 and can be extracted from an edge and a border of an object. The processor 130 may compare a plurality of feature points of the first frame and a plurality of feature points of the second frame adjacent to the first frame and analyze shaking of the feature point.

Figure 7B:
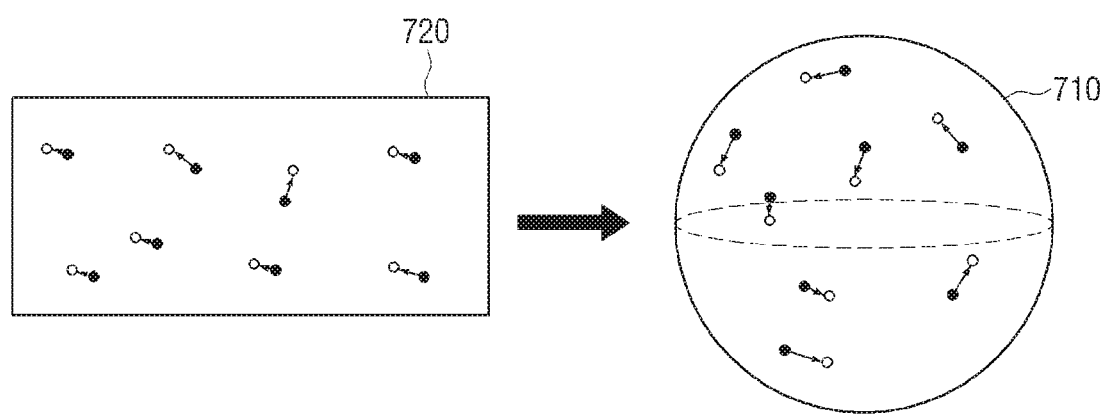

According to an exemplary embodiment described above, it is described that, after reflecting panorama image to the 3D virtual sphere 710, the feature point is extracted from panorama image which is reflected to the virtual sphere, but this is merely exemplary, and as illustrated in FIG. 7B, it is also possible to, after extracting a feature point from the 2D panorama image 720, reflect the feature point to the 3D virtual sphere 730 to analyze shaking of the feature point.

Figure 8:
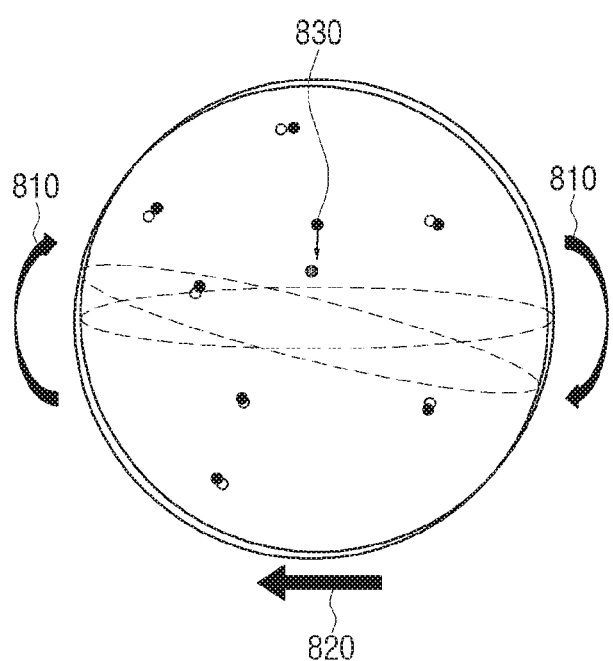

The processor 130 may analyze shaking of a plurality of feature points from 3D panorama image that is reflected to a virtual sphere and determine correction movements. According to an exemplary embodiment, the processor 130 may determine correction movements of a virtual sphere which make shaking of the plurality of feature points be minimal. That is, the processor 130, as illustrated in FIG. 8, may determine correction movements of the virtual sphere so that Euclidean distance between the first feature point of the first frame and the second feature point corresponding to the first feature point can be minimum. At this time, the processor 130 may determine correction movements which make Euclidean distance be minimum using downhill algorithm or conjugated gradient algorithm. Here, correction movements of the virtual sphere may include a straight line movement 820 as well as rotation movement 810.

In addition, the processor 130 may determine correction movements of the virtual sphere excluding a feature point having shaking which is greater than a preset value from among a plurality of feature points. That is, the processor 130 may determine a feature point 830 having shaking which is greater than a preset value as outlier and determine correction movements using feature points other than the outlier. Due to the above, the processor 130 may determine correction movements of the virtual sphere which are more accurate.

At this time, it has been described that the outlier is extracted by analyzing shaking of the feature point, but this is merely exemplary, and the outlier can be extracted using shaking sensing value which is acquired using a shaking sensor such as an acceleration sensor and a rotation sensor. That is, the processor 130 may determine a feature point that has shaking which has a deviation which is greater than a preset value as the outlier.

In addition, the processor 130 may correct each frame reflected to the 3D virtual sphere based on correction movements of the virtual sphere, re-reflect it to a 2D image, and acquire 2D panorama image with corrected shaking.

Figure 9:
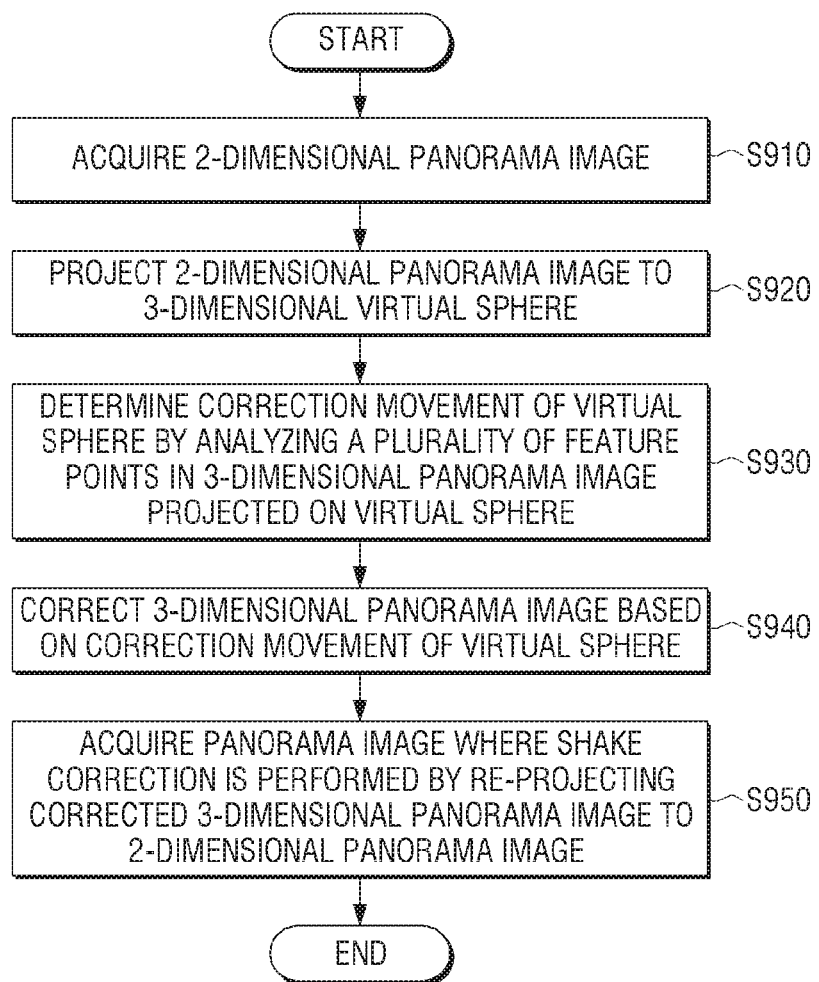

FIG. 9 is a flowchart to describe a controlling method of an electronic apparatus according to an exemplary embodiment. First of all, the electronic apparatus 100 acquires a 2D panorama image (S910). At this time, the electronic apparatus 100 may acquire the 2D panorama image using a plurality of images, but this is merely exemplary and a panorama image may be acquired through another method. For example, the electronic apparatus 100 may acquire a panorama image photographed by an external apparatus.

The electronic apparatus 100 projects a 2D panorama image to a 3D virtual sphere (S920).

The electronic apparatus 100 determines correction movements of the virtual sphere by analyzing shaking of a plurality of feature points from a 3D panorama image projected to the virtual sphere (S930). At this time, the electronic apparatus 100 may determine shaking of the virtual sphere which lets shaking of the feature point to be minimum from a 3D panorama image reflected to the virtual sphere.

The electronic apparatus 100 corrects a 3D panorama image based on correction movements of the virtual sphere (S940), re-projects the corrected 3D panorama image to a 2D panorama image, and acquires a panorama image with corrected shaking (S950).

According to an exemplary embodiment described above, shaking of a camera which may occur in a panorama image due to hand shaking or walking can be corrected.

Figure 10A:
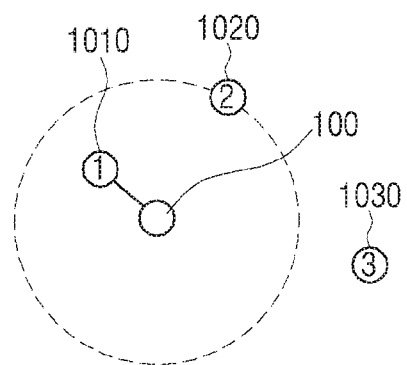
Figure 10B:
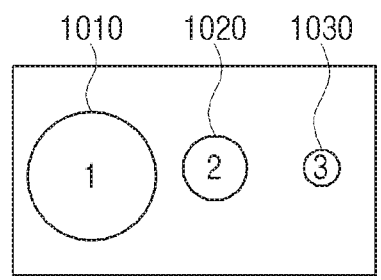

FIGS. 10A to 13 are views provided to explain an example of adjusting size of an object in a panorama image according to another exemplary embodiment. According to an exemplary embodiment, when a panorama image is photographed by electronic apparatuses which may photograph 360 degrees, a panorama image of 360 degrees is obtained based on a virtual sphere of which radius in every direction is the same regardless of a position of an object. At this time, as illustrated in FIG. 10A, when the objects are located adjacent to the electronic apparatus 100 in an order of a first object 1010, second object 1020, and third object 1030, the electronic apparatus 100, as illustrated in FIG. 10B, size of an object gets bigger in an order of the first object 1010, second object 1020, and third object 1030. In particular, when the electronic apparatus 100 is a hand-held apparatus, there may be a problem that a photographer is reflected in an image as a too big image unnaturally, as it is common that an object which is most adjacent to the electronic apparatus 100 is a photographer. That is, there is a problem that size of a photographer is too big and it may cause inconvenience to a photographer.

Therefore, the processor 130 may obtain a panorama image, extract an object from a panorama image, generate an anisotropic virtual sphere based on an extracted object and reflect the panorama image to a virtual sphere, re-reflect a 3D panorama image reflected to an anisotropic virtual sphere to 2D to obtain a panorama image with adjusted size of an object.

Figure 11A:
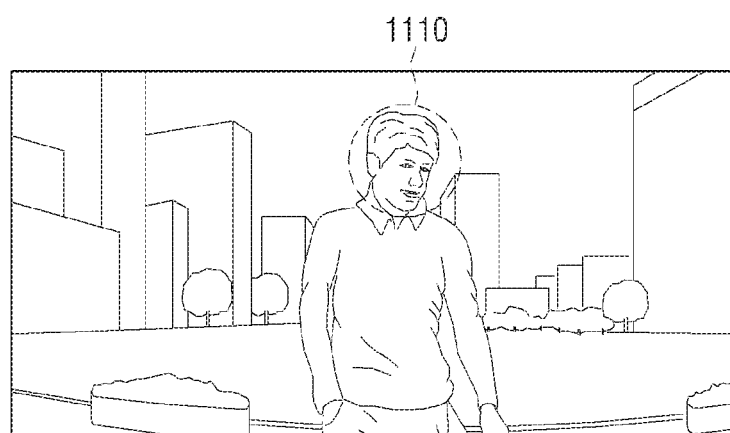
Figure 11B:
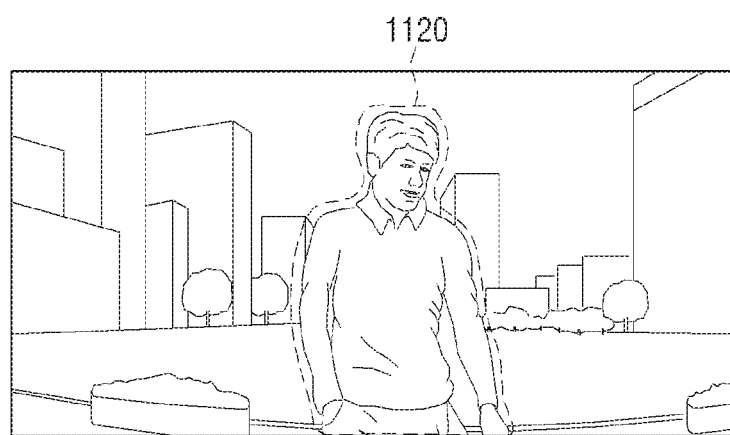

According to an exemplary embodiment, the processor 130 may acquire a panorama image using a plurality of images photographed by a plurality of cameras 110. At this time, the processor 130 may detect an object from the acquired panorama image. At this time, an object is an object to adjust size and is located adjacent to the electronic apparatus 100 but this is merely exemplary and it can be preset human. For example, the processor 130, to extract an object, as illustrated in FIG. 11A, may recognize a face 1110 of a photographer, analyze an area adjacent to the recognized face 1110, and as illustrated in FIG. 11B, may detect an object to adjust size of an area 1120 of a photographer. In this case, the processor 130 may calculate an outer line at which distortion of the area 1120 of a photographer is minimized by analyzing an area adjacent to the recognized face 1110. In particular, the processor 130 may calculate an outer line of the area 1120 of the photographer using seam carving algorithm from contents recognition technology.

Figure 12A:
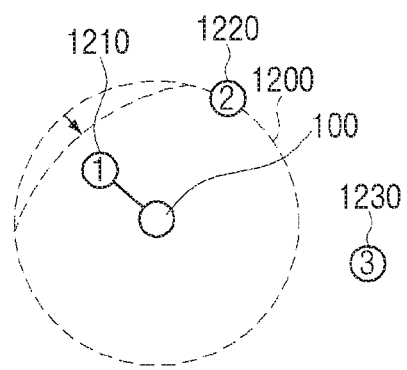

The processor 130 may generate an anisotropic virtual sphere based on the extracted object and reflect a panorama image. According to an exemplary embodiment, when an object is an object that the first object 1210 is extracted from the objects illustrated in FIG. 12A, the processor 130, as illustrated in FIG. 12A, may generate a sphere 1200 in an anisotropic shape by reducing an area adjacent to the first object 1210 extracted from the virtual sphere. That is, the anisotropic sphere 1200 (for example, the electronic apparatus 100) may have a shorter distance from the first object 1210 compared to distance from remaining area.

Figure 12B:
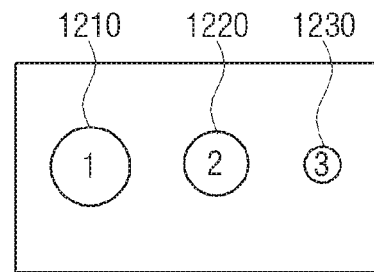

In addition, the processor 130, as illustrated in FIG. 12B, may re-reflect a panorama image reflected to the anisotropic virtual sphere to acquire a panorama image with adjusted size of the first object 1210. That is, distance to which the first object 1210 is reflected becomes short from among the entire objects and size of the first object 1210 can be reduced from a 2D panorama image. At this time, the processor 130 may minimize sense of difference of an object with reduced size using feathering algorithm.

According to an exemplary embodiment described above, size of an object is adjusted using a anisotropic virtual sphere, but this is merely exemplary, and size of an object can be adjusted through optical lens design.

An exemplary embodiment described above illustrates that an anisotropic sphere is used to reduce size of an object, but this is merely exemplary, and an anisotropic sphere can be used to increase size of an object. For example, the processor 130 may increase size of an object by using anisotropic sphere, with reference to the center (for example, the electronic apparatus 100), that a distance with an area which is adjacent to the object to increase size is farther than distance with a remaining area.

FIG. 13 is a flowchart to describe a controlling method of an electronic apparatus to adjust size of an object according to another exemplary embodiment.

The electronic apparatus 100 acquires a panorama image (S1310). At this time, the electronic apparatus 100 may acquire a 2D panorama image using a plurality of images, but this is merely exemplary, and a panorama image can be acquired through a different method. For example, the electronic apparatus 100 may acquire a panorama image photographed by an external apparatus.

In addition, the electronic apparatus 100 detects an object from a panorama image (S1320). At this time, the electronic apparatus 100 may extract a photographer as an object through face recognition from a panorama image, but this is merely exemplary and may extract an object having a biggest size which is nearest to the electronic apparatus 100 from a panorama image.

In addition, the electronic apparatus 100 generates anisotropic virtual sphere based on the extracted object and reflects a panorama image (S1330). For example, when intending to reduce size of the extracted object, the electronic apparatus 100 may generate anisotropic virtual sphere whose distance of an area which is near the extracted object is shorter than distance with other area.

In addition, the electronic apparatus 100 may re-reflect 3D panorama image which is reflected to anisotropic virtual sphere to 2D and acquire a panorama image with adjusted size of an object (S1340).

According to an exemplary embodiment described above, the electronic apparatus 100 may acquire more natural panorama image as size of a photographer is naturally reduced in the 360-degree panorama image.

The controlling method of the electronic apparatus 100 which provides a panorama image as described above may be implemented as at least one execution program which can be stored in a non-transitory computer readable recording medium.

Non-transitory computer readable recording medium may indicate a medium which store data semi-permanently and can be read by devices, not a medium storing data temporarily such as register, cache, or memory. Specifically, the above-described programs can be stored various types of recording media which can be read by a terminal, such as Random Access Memory (RAM), flash memory, Read Only Memory (ROM), Erasable Programmable ROM (EPROM), Electronically Erasable and Programmable ROM (EEPROM), register, hard disk, removable disk, memory card, USB memory, CD-ROM, etc.

While exemplary embodiments are described herein, it will be understood by those skilled in the art that various changes in form and details may be made therein without departing from the spirit and scope as defined by the appended claims and their equivalents.

What is claimed is:

1. An electronic apparatus configured to acquire a panorama image, the apparatus comprising:
    a plurality of cameras, each configured to capture an image; and
    a processor configured to:
        acquire a pre-corrected two-dimensional (2D) panorama image using a plurality of images captured by the plurality of cameras;
        project the pre-corrected 2D panorama image to a three-dimensional (3D) virtual sphere, determine correction movements of the virtual sphere by analyzing correction movements of a plurality of feature points in the 3D panorama image projected to the virtual sphere;
        correct the 3D panorama image based on the correction movements of the virtual sphere; and
        acquire a shake-corrected panorama image by re-projecting the corrected 3D panorama image to a corrected 2D panorama image.

2. The apparatus as claimed in claim 1, wherein the processor is further configured to determine correction movements of the virtual sphere to minimize movement of the plurality of feature points.

3. The apparatus as claimed in claim 1, wherein the processor is further configured to determine correction movements of the virtual sphere by excluding a feature point that has movement that is greater than or equal to a preset value from among the plurality of feature points.

4. A controlling method of an electronic apparatus to acquire a panorama image, the method comprising:
    acquiring a pre-corrected two-dimensional (2D) panorama image using a plurality of images captured by the plurality of cameras;
    projecting the pre-corrected 2D panorama image to a three-dimensional (3D) virtual sphere, determine correction movements of the virtual sphere by analyzing correction movements of a plurality of feature points in the 3D panorama image projected to the virtual sphere;
    correcting the 3D panorama image based on the correction movements of the virtual sphere; and
    acquiring a shake-corrected panorama image by re-projecting the corrected 3D panorama image to a corrected 2D panorama image.

5. The method as claimed in claim 4, wherein the correcting comprises determining correction movements of the virtual sphere to minimize movement of the plurality of feature points.

6. The method as claimed in claim 4, wherein the correcting comprises determining correction movements of the virtual sphere by excluding a feature point that has movement that is greater than or equal to a preset value from among the plurality of feature points.

* * * * *